United States Patent [19]
Barnea et al.

[11] Patent Number: 5,412,573
[45] Date of Patent: May 2, 1995

[54] MULTI-MODE ROUTE GUIDANCE SYSTEM AND METHOD THEREFOR

[75] Inventors: Michael Barnea; Allan Kirson, both of Highland Park, Ill.

[73] Assignee: Motorola Inc., Schaumburg, Ill.

[21] Appl. No.: 64,312

[22] Filed: May 20, 1993

[51] Int. Cl.⁶ .......................................... G06F 165/00
[52] U.S. Cl. .................................. 364/449; 364/444; 340/990; 340/995
[58] Field of Search ............... 364/443, 444, 449, 436; 340/988, 990, 995, 905; 73/178 R

[56] References Cited

U.S. PATENT DOCUMENTS

| | | | |
|---|---|---|---|
| 4,481,584 | 11/1984 | Holland | 364/436 |
| 4,546,439 | 10/1985 | Gene Esparza | 364/444 |
| 4,570,227 | 2/1986 | Tachi et al. | 364/444 |
| 4,796,189 | 1/1989 | Nakayama et al. | 364/449 |
| 4,878,170 | 10/1989 | Zeevi | 364/449 |
| 4,926,336 | 5/1990 | Yamada | 364/444 |
| 4,937,753 | 6/1990 | Yamada | 364/449 |
| 4,984,168 | 1/1991 | Neukrichner et al. | 364/449 |
| 5,031,104 | 7/1991 | Ikeda et al. | 340/990 |
| 5,257,023 | 10/1993 | Furuya | 364/436 |
| 5,272,638 | 12/1993 | Martin et al. | 340/990 |
| 5,293,163 | 3/1994 | Kakihara et al. | 340/988 |
| 5,313,200 | 5/1994 | Sone | 364/436 |

*Primary Examiner*—Gary Chin
*Attorney, Agent, or Firm*—Michael Barnea; Allan Kirson

[57] ABSTRACT

A multi-mode route guidance system and a corresponding method for same include a device to determine a present position, preferable a GPS receiver, and an input device (111) for inputting a traveler specified destination position. A map database (115) provides memory capable of storing a first, or topology, type of record (225) that has topology and connectivity information (227), and a second, or route guidance, type of record (217) that has topology, connectivity, and traffic flow restriction information (227, 229). A route guidance device (101) retrieves selected records (217, 219, 221, 223, 225) from the map database (115). The selected records (217, 219, 221, 223, 225) retrieved are determined by the specified destination position and the present position of the traveler. The route guidance device (101) uses a selected record of the first type (225) to provide ground track guidance cues (601) to the traveler, and a selected record of the second type (217) to provide maneuver instruction guidance cues (501) to the traveler. Other system features include partial route planning for generating guidance instructions for guiding the traveler to an intermediate position (941) nearest to the destination position of the traveler (909), and displaying transition screens when the traveler is about to transit from a position covered by a map database having route guidance type records to a map data base having topology type records and vice-versa.

15 Claims, 6 Drawing Sheets

MULTI-MODE ROUTE GUIDANCE SYSTEM AND METHOD THEREFOR

FIELD OF THE INVENTION

This invention is generally directed to the field of navigation and more particularly to systems for providing route guidance to a traveler based on a map reference.

BACKGROUND OF THE INVENTION

Typical navigation systems can be essentially categorized into at least two distinct types, dot-on-the-map and route guidance. The dot-on-the-map type navigation systems are based on topology map databases. These topology map databases are relatively commonplace and many navigation systems have been designed to use this type of map database to guide a traveler between an origin and a destination position. Topology map databases typically are limited to providing elementary topological information. In those map databases used in vehicular navigation systems this may include road segment identification, road segment end points and road segment predecessors and successors. Because these map databases have no traffic flow restriction information, such as one way streets, dead end streets, speed limits, maximum vehicle weight, and maximum vehicle height, to name a few, they are limited in usefulness. This is because if the system is asked to plan and guide the traveler along a route it may plan impossible, or certainly inconvenient, routes for the traveler to follow. Typically, dot-on-the-map systems display an electronic map and a symbol, typically a dot, corresponding to the traveler's present position. The traveler will traverse a route with no advice from the system other than a pointer in the line of sight direction of a selected destination position.

Route guidance systems, on the other hand, generate a route plan between a present position and a selected destination position and then guide the traveler in real time via a series of visual and/or aural guidance instructions.

Both the dot-on-the-map and route guidance systems rely on the availability of maps, typically in the form of digital map databases. Most of the United States, Europe, and Japan are already covered by topology map databases containing road network topology and connectivity information. These topology map databases are adequate for dot-on-the-map type navigation systems.

In contrast, route guidance systems require traffic flow restriction information in addition to the road network topology information provided in the topology databases. The map databases required for this enhanced function are typically known as route guidance maps. In addition to the conventional topological information discussed above they will include various traffic flow restriction information, also introduced above. Availability of these route guidance maps is limited and full global coverage may never be available. Also, coverage for the top forty metropolitan areas in the United States is not expected for some time to come. Since route guidance systems are useful only in areas covered by route guidance map databases, the application of these systems is limited to the relatively few locations having corresponding route guidance map databases until wider map coverage is available.

What is needed is an improved route guidance system that enables a traveler to use either a topology map database or a route guidance database to provide improved navigation capabilities for either navigating in a area covered by a route guidance database or a topology map database. This will enable a user to use either type map database as desired, or as available.

BRIEF DESCRIPTION OF THE DRAWINGS

FIG. 3-1 and 3-2 together constitute a software flowchart showing method steps corresponding to a software program encoded into the navigation computer shown in FIG. 1;

DETAILED DESCRIPTION OF A PREFERRED EMBODIMENT

A preferred embodiment of a multi-mode route guidance system and a corresponding method are detailed below.

The system includes an input device used by a traveler to specify a desired destination position. Alternatively, if this system is mounted in a vehicle, the driver can specify the destination position for the vehicle. A position determining device provides information indicative of a present position of the traveler. A map database provides memory capable of storing a first type of record that has topology and connectivity information, and a second type of record that has topology, connectivity, and traffic flow restriction information. A route guidance device retrieves selected records from the map database. The selected records retrieved are determined by the specified destination position and the present position of the traveler. The route guidance device uses a selected record of the first type to provide ground track guidance cues to the traveler, and a selected record of the second type to provide maneuver instruction guidance cues to the traveler. Preferably, the guidance cues are provided responsive to the present position of the traveler. Alternatively, the traveler may scroll through the available guidance instructions using the input device.

Also, the system can use selected records of the second type to plan a route. Once a route is planned, route guidance cues, including maneuver instructions are presented to the traveler. A route is planned by first determining an end node for the route planning function, that shall hereinafter be referred to as the end node for planner. The end node for planner is equated to the destination position of the traveler, if the selected records allow for connecting a path having traffic flow restriction attributes between the provided present position and the destination position of the traveler. The end node for planner is equated to an intermediate position nearest to the destination position of the traveler, if the set of records retrieved does not allow for connecting a path having traffic flow restriction attributes between the provided present position and the destination position of the traveler, and allows for connecting a path having traffic flow restriction attributes between the present position of the traveler and the intermediate position. A route is planned between the present position and the end node for planner using the available selected records of the second type. Note that selected records of the second type are those that have associated traffic flow restriction information. Then, a maneuver list including maneuver instructions is determined from the planned route. Presented next, are the details of the system.

Figure 1:
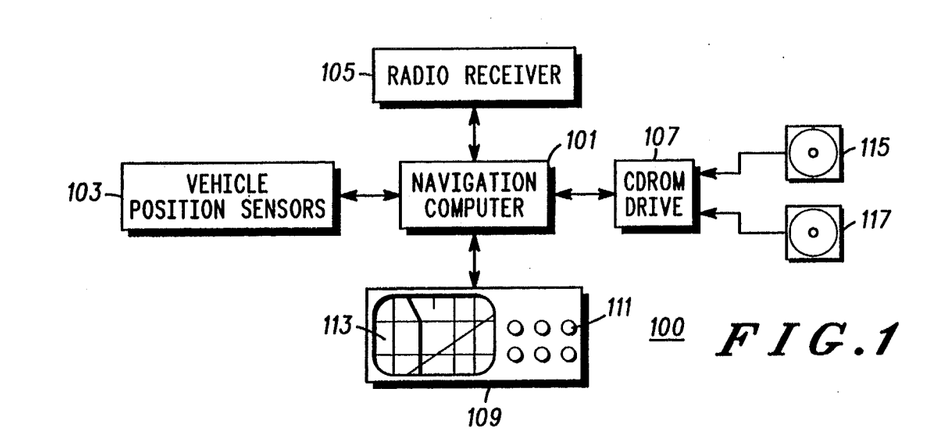
FIG. 1 is a hardware block diagram of a route guidance system in accordance with the invention.

Referring to FIG. 1 a system block diagram is shown. In the preferred embodiment, the system is shown as applied to a vehicle. Of course, those skilled in the art will recognize that other platforms such as hand held devices, that may be used without a vehicle, may also take advantage of the disclosed system and method. An apparatus 100 is mounted in a vehicle such as an automobile. Element 101 is a navigation computer. In the preferred embodiment this computer includes a Motorola MC68340 microprocessor, program memory, variable memory, and various support circuitry for interfacing with attached peripheral devices. These attached peripheral devices include vehicle position sensors 103, a radio receiver 105, a CDROM (Compact Disc Read Only Memory) drive 107, and a display/input device 109. The vehicle position sensors 103 are employed to determine a present position of the traveler, or in this case the vehicle. These sensors include a differential odometer and a flux-gate compass. Of course, other positioning sensors such as a Global Positioning System (GPS) Receiver could be substituted or added to these sensors. The radio receiver 105 is used to receive current traffic information from a broadcasting transmitter. The current traffic information can be used by the navigation computer 101 to plan a route that avoids areas congested at certain times. Alternatively, the radio receiver 105 could be replaced by a GPS receiver for providing a present position of the traveler or vehicle as suggested earlier. The CDROM drive 107 reads optical disks 115, 117 containing various map databases. Of course, other mass storage devices may be used in place of the CDROM drive 107. The display/input device 109 includes a display 113 for displaying navigation guidance information, and a keypad 111 for inputting various traveler information such as a destination position. Of course, those skilled in the art will recognize that an auditory input/output system may be substituted or used in tandem with this display/input device 109 to communicate pertinent navigation information with the traveler.

Alternatively, if the platform for this improved system is a hand-held device, present position could be determined by the traveler entering his position into the navigation computer 101 via the keypad 111, and the CDROM and disks could be replaced with a PCMCIA (Personal Computer Memory Card Interface Association) reader and cards. Also, this system could be applied in a vehicle without a positioning system. Also, in this case, the present position could be entered by the traveler into the navigation computer 101 via the keypad 111.

As mentioned in the Background section of this application, navigation map databases are offered with differing levels of information. This includes topology only map databases which are useful for dot-on-the-map type guidance, and route guidance map databases which are useful for providing a traveler with full route planning and guidance instructions. The system 100 described above, has the ability to interpret these different databases. Of course, if another type of database—such as one describing the location of Austrian restaurants that invoked a Mozart theme when a traveler approached one, are interpretable in this new and improved system.

When the vehicle is positioned where map data with traffic flow restriction information is available, and a destination position has been selected, route guidance instructions will be displayed. When the vehicle is positioned where only topology map data is available, an advisory mode will be entered and only topology information will be displayed. This topology information may include a display of vehicle ground track and approaching intersections. When the vehicle position is transitioning from an area covered by one map database type to another database type, a transition screen will be displayed indicating which type of displayed guidance cues will be available for guidance next.

Another aspect of the system, and corresponding method is the provision for route planning. Of particular interest is the provision for planning a route when traffic flow restriction information is available for only a portion of the route between a present position and a selected destination position. In this case, a route will be planned using the traffic flow restriction available for that portion only. If a discontinuity in the map database occurs, because either no map or a topology only type map is available between the present position of the vehicle and the destination position, then a point on a boundary of the traffic flow restriction map database nearest to the destination position will be used as an intermediate position to plan and generate route guidance instructions. Note that the term nearest may mean nearest in travel time, or nearest in distance to traverse, or most convenient to reach to name a few possibilities. Once the vehicle transits beyond this intermediate position, there will be no route guidance maneuver instructions available. While the vehicle is unguided, if a topology map database is available, the advisory mode, including the vehicle's ground track and approaching intersections, will be displayed. If no map is available, the display 113 will indicate that fact to the vehicle operator. If the vehicle enters an area covered by a map database having traffic flow restriction information, then the route planner will attempt to connect the vehicle's present position to the destination position and generate guidance instructions.

In the preferred embodiment the differing map database types are pre-merged onto a single CDROM. Optionally, a portion of the map database could be embedded into data memory located in the navigation computer 101. For instance this could be a topology map database covering a broad area such as the continental United States. Then a vehicle operator could purchase a map database with traffic flow restriction information for a certain area of interest. Since traffic flow restriction information is voluminous, with current CDROM technology about a four state area will fit on a single CDROM disk. The embodiments characterized herein are insensitive to what map database media or organization is used. The pre-merging approach simplifies the method of route planning, guidance and display but is only one of several viable approaches.

Figure 2:
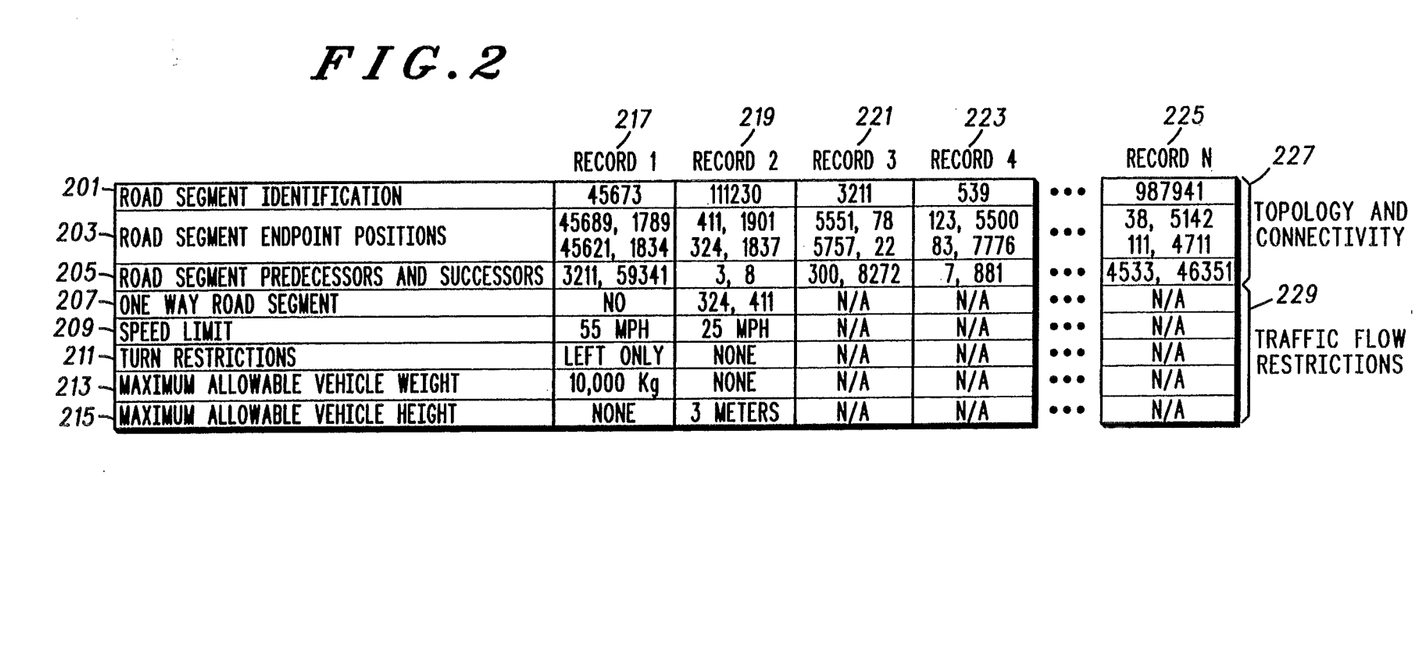
FIG. 2 is a shows chart illustrating a structure and data from a map database having various navigation information in accordance with the invention.

FIG. 2 illustrates a structure and data from a map database having various navigation information including both topology and traffic flow restriction information. This is an example of a particular organization for a merged map database having both types of information. The merged map database has various fields including a ROAD SEGMENT IDENTIFICATION field 201, a ROAD SEGMENT ENDPOINT POSITIONS field 203, a ROAD SEGMENT PREDECESSORS AND SUCCESSORS field 205, a ONE WAY ROAD SEGMENT field 207, a SPEED LIMIT field 209, a TURN RESTRICTIONS field 211, a MAXIMUM ALLOWABLE VEHICLE WEIGHT field 213, and a MAXIMUM ALLOWABLE VEHICLE HEIGHT field 215.

The ROAD SEGMENT IDENTIFICATION field 201 identifies a unique road segment number, for each road segment associated with each road segment's position as represented on a map. In RECORD 1 217 the ROAD SEGMENT IDENTIFICATION designation is 45673.

The ROAD SEGMENT ENDPOINT POSITIONS field 203 identifies a latitude and longitude position for each of the extremities of the road segment identified in the ROAD SEGMENT IDENTIFICATION field 201. In RECORD 2 219 the ROAD SEGMENT ENDPOINT POSITIONS field 203 shows a first endpoint positioned at 45689 and 1789, and a second endpoint positioned at 45621 and 1834.

The ROAD SEGMENT PREDECESSORS AND SUCCESSORS field 205 identifies the road segment identification number of road segments connected to the particular road segment in the associated map database field. An example of this is that for RECORD 2 219, road segments with road segment identifications of 3 and 8 are connected to road segment 111230.

The ONE WAY ROAD SEGMENT field 207 is encoded to indicate whether or not a particular associated road segment has a one way restriction concerning direction of traffic flow on that road segment. For instance, if no one way restriction exists an NO can be encoded into the field as shown in field 207 of RECORD 1 217. In RECORD 2 219 the direction of travel is indicated by the position of the 2 variables 324 and 411 in the ONE WAY ROAD SEGMENT field 207.

The SPEED LIMIT field 209 identifies the speed limit of the associated road segment. For instance in RECORD 2 219 the speed limit associated with the road segment 111230 is 25 MPH.

The TURN RESTRICTIONS field 211 identifies any turn restrictions associated with the corresponding road segment. For instance in the case of RECORD 1 217 a LEFT ONLY code is found in the associated TURN RESTRICTIONS field 211.

The MAXIMUM ALLOWABLE VEHICLE WEIGHT field 213 identifies a maximum allowable vehicle weight for a vehicle traversing on a particular road segment. In the case of RECORD 1 217 this is 10,000 kg.

The MAXIMUM ALLOWABLE VEHICLE HEIGHT field 215 identifies the maximum allowable vehicle height for a vehicle traversing on a particular road segment. In the case of RECORD 2 219 this is 3 meters.

Reference number 227 identifies the particular fields associated with topology and connectivity attributes characteristic of topology map databases. Reference number 229 identifies the particular fields associated with traffic flow restriction attributes characteristic of route guidance map databases. RECORD 1 217, and RECORD 2 219 have both topology and connectivity information and traffic flow restriction attributes. These records are considered to have full route guidance information. These records, 217 and 219, are of the second type described earlier. RECORD 3 221, RECORD 4 223, and RECORD N 225, have both topology and connectivity information but lack traffic flow restriction attributes. These records are considered to have topology information only. These records, 221, 223, and 225, are of the first type described earlier. This is important to note because if a route guidance system's route planner attempted to plan and guide a traveler along a route using only this type of data, the planner could connect the road segments. However, the route planner may ask the traveler to transit against the flow of traffic if a planned road segment included a one way street and the planner showed a path opposite traffic flow on that segment.

FIG. 2 represents one embodiment for a merged map database having a multitude of records encoded with various types of information including topology and traffic flow restriction attributes. Those of ordinary skill in the art will recognize many other equivalent yet different organizations for this data. Next, method steps associated with the system shown in FIG. 1 are presented.

Figure 31:
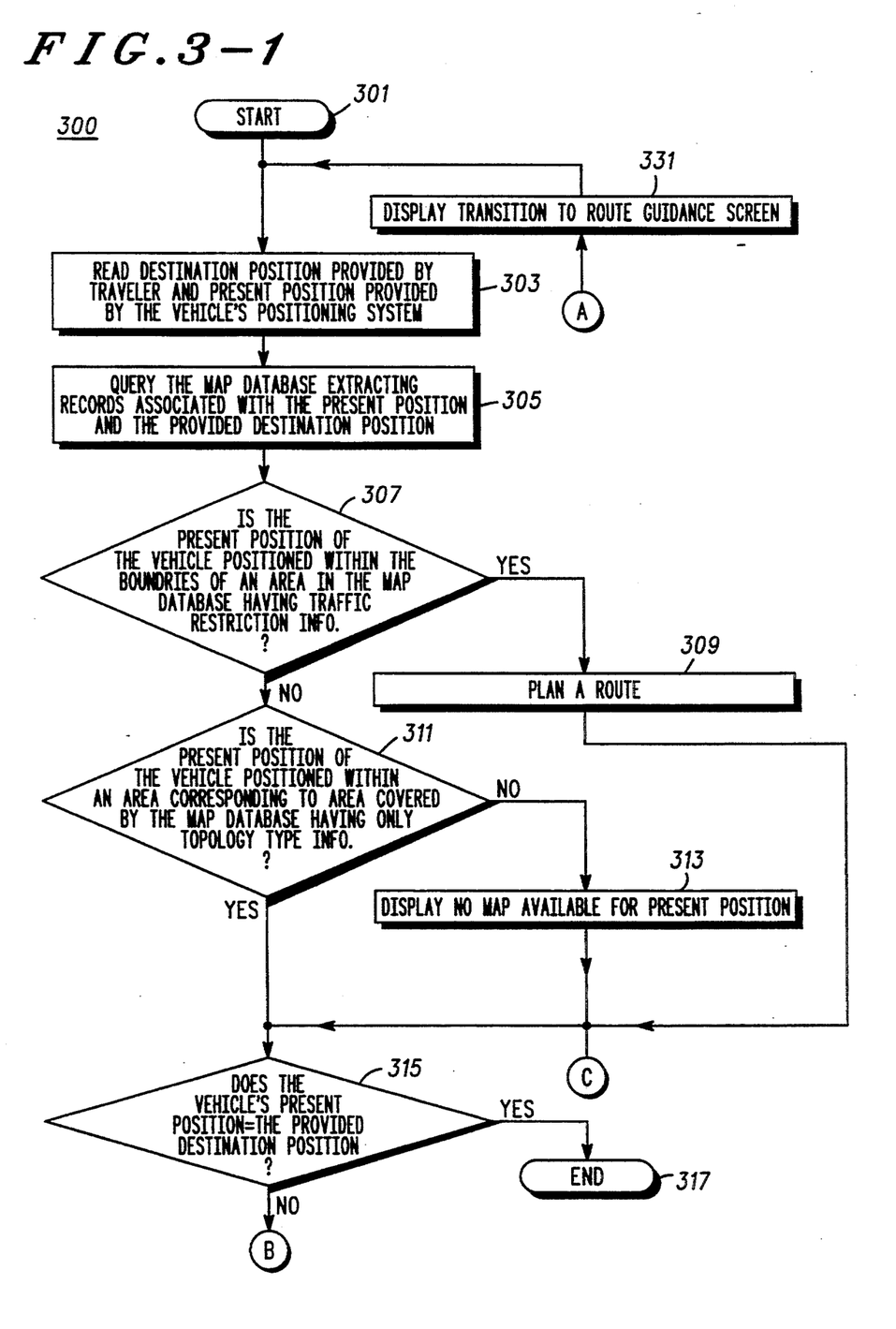
Figure 32:
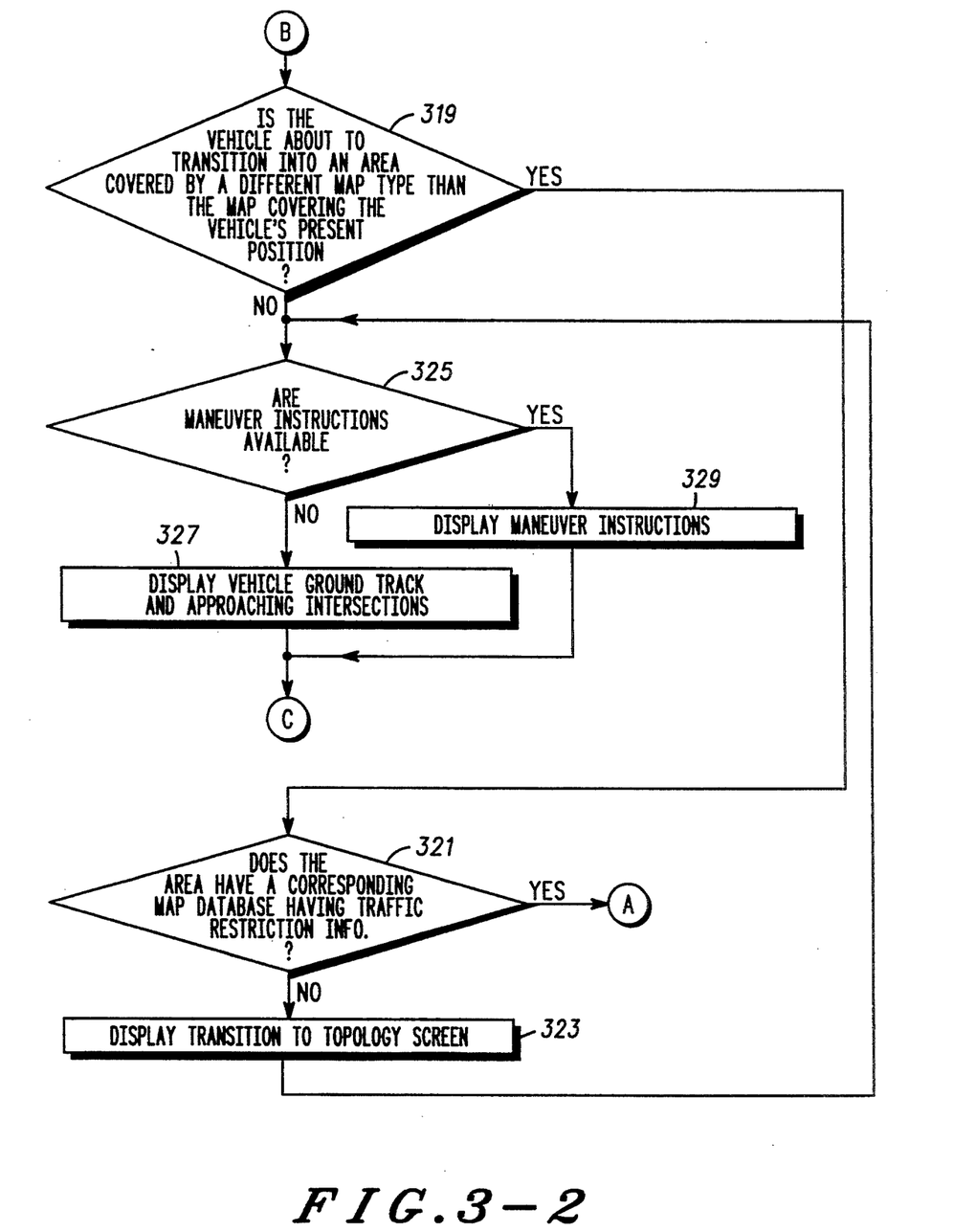

FIG. 3-1 and 3-2 together constitute a software flowchart showing method steps encoded into the navigation computer's 101 program memory. They represent typical programming steps necessary to provide the improved system of route guidance. The routine is called by a host, or supervisory, program running within the navigation computer. The purpose of these method steps is to provide full route guidance when the map database associated with the vehicle position has traffic flow restriction information available. If there is a discontinuity between the present position of the vehicle and the specified destination position, then the method enables guidance to an intermediate position nearest to the specified destination position. If the map database associated with the vehicle position lacks traffic flow restriction information, then the traveler will either be presented with topology type information, which may include vehicle ground track and approaching intersections, or other applicable information depending on the available map.

The routine starts at step 301. At step 303 the navigation computer 101 reads a destination position provided by a traveler via the keypad 111 on the display/input device 109, and a present position at the position of the vehicle. This present position is provided by the vehicle position sensors 103. Alternatively, in a hand held unit a portable GPS receiver could provide the present position of the traveler.

Next, in step 305 the navigation computer 101 queries a map database provided on CDROM 115 mounted on the CDROM Drive 107. This operation selects particular records, or road segments, associated with the present position of the vehicle and the specified destination position. In essence, road segments associated with an area surrounding the present position are extracted first.

Then, in step 307 the navigation computer 101 tests to see if the present position of the vehicle, as determined above, is positioned within boundaries of an area on the map having traffic flow restriction information. If the present position of the vehicle is within boundaries of an area on the map having traffic flow restriction information, then step 309 is executed.

Figure 4:
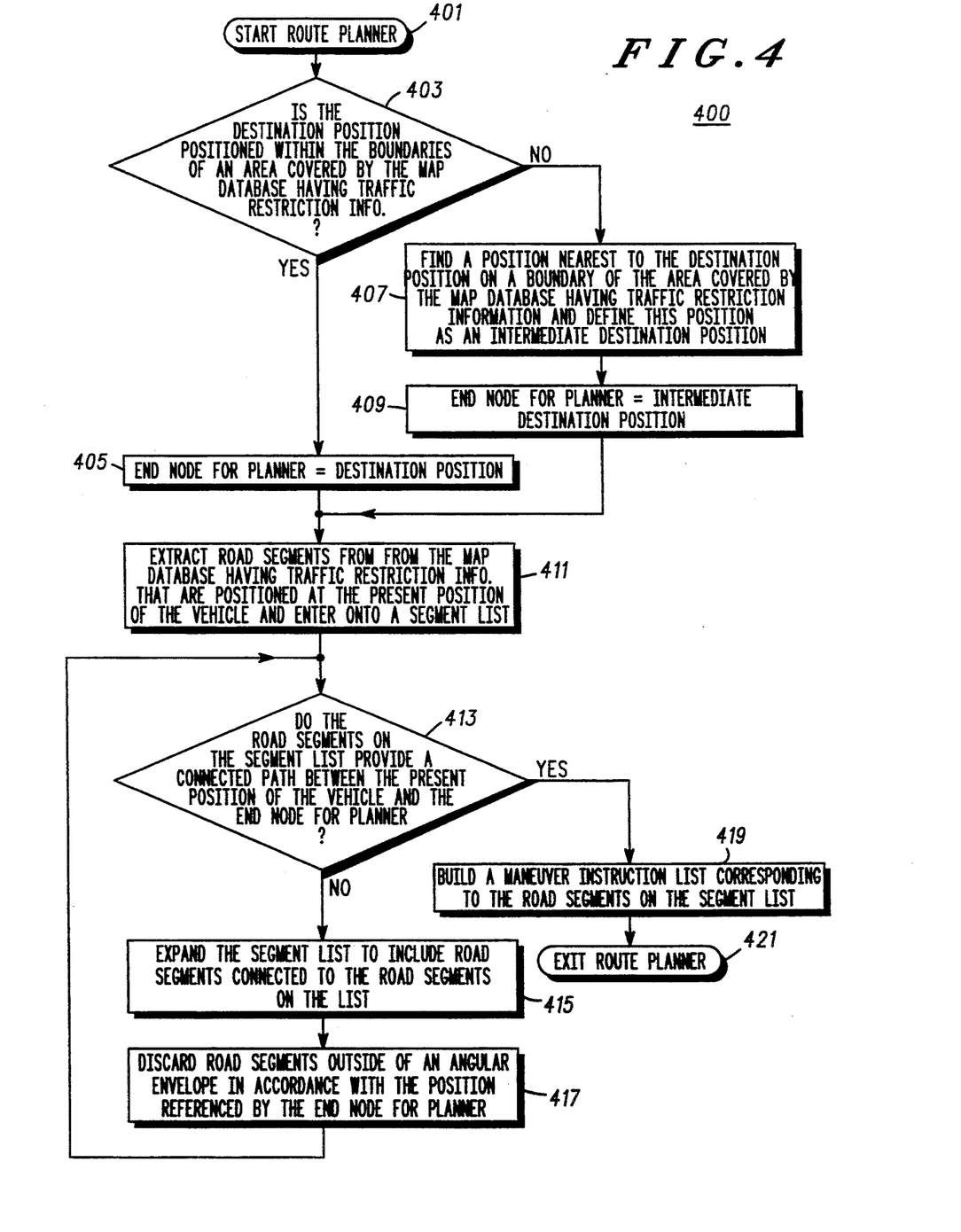
FIG. 4 is a software flowchart showing method steps corresponding to a software program callable from the main program shown in FIG. 3-1 and 3-2.

In step 309 a route is planned. The details of this route planning method are shown in FIG. 4 and detailed below.

If the present position of the vehicle is not within boundaries of an area on the map having traffic flow restriction information then step 311 is executed. In step 311 a test is executed to determine if the present position of the vehicle is positioned within an area covered by the map database having only topology type information. If the answer is yes, then step 315 is executed. If the answer is no, then in step 313 the navigation computer 101 will display "NO MAP AVAILABLE FOR PRESENT POSITION" on the display 113.

Step 315 follows steps 309, 311, and 313. In step 315 the navigation computer 101 checks to see if the present position of the vehicle is the same as the destination position specified by the traveler. If it is, then the routine 300 is exited in step 317. If the present position of the vehicle is not the same as the destination position specified by the traveler, then the guidance method continues to step 319.

In step 319 a test is executed to determine if the present position of the vehicle is about to transition into an area covered by a different map type than the map corresponding to the vehicle's present position. In other words, the vehicle may be positioned where currently there are traffic flow restriction attributes in the map database, and is about to change position to an area where the map database lacks traffic flow restriction information but has topology and connectivity information. If a transition is about to occur, then step 321 is executed.

Figure 7:
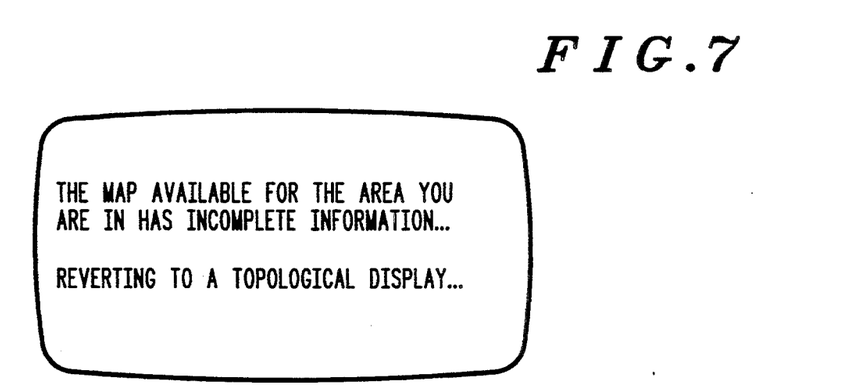
FIG. 7 illustrates additional detail of a visual display shown in FIG. 1.

In step 321 a test is executed to determine whether or not the area that the vehicle is about to transition into has records in the map database that have associated traffic flow restriction information. If it doesn't, then in step 323 the navigation computer 101 sends information to the display 113 indicating a transition in position to an area having topological display only. A typical display is shown in FIG. 7. If in step 321 the navigation computer 101 determines that the area that the vehicle is about to transition into has records in the map database that have associated traffic flow restriction information, then step 331 is executed.

Figure 8:
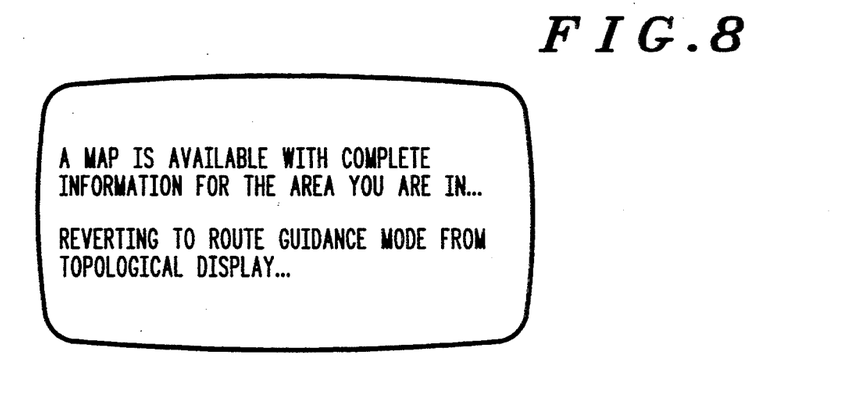
FIG. 8 illustrates additional detail of a visual display shown in FIG. 1.

In step 331 the navigation computer 101 sends information to the display 113 indicating a transition in position to an area having route guidance capability and the routine 300 is reentered at step 303. A typical display is shown in FIG. 8. Note that the routine 300 is reentered at step 303 in this case so that a new route may be planned.

Figure 5:
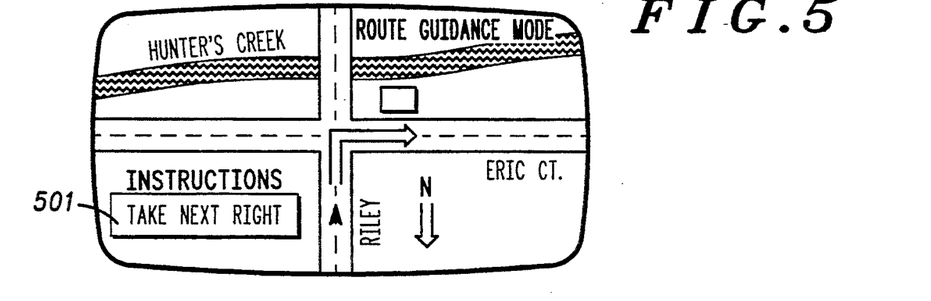
FIG. 5 illustrates additional detail of a visual display shown in FIG. 1.

Returning to step 319, if a transition is not about to occur then step 325 is executed. In step 325 the navigation computer 101 determines whether or not maneuver instructions are available for cueing the traveler. Note that the provision of these maneuver instructions is detailed later in the route planning method that was mentioned earlier. If maneuver instructions are available then the vehicle position must correspond to a position on the map database that has traffic flow restriction information, or attributes, and in step 329 the maneuver instructions are shown on the display 113. A typical display format showing maneuver instructions can be seen in FIG. 5 and specifically at reference number 501. If maneuver instructions are not available then the vehicle position must correspond to a position on the map database that lacks traffic flow restriction information, or attributes, and in step 327 the dot-on-the-map type display, in this case vehicle ground track and approaching intersections are shown on the display 113. A typical display format showing vehicle ground track 601 and approaching intersections 603 can be seen in FIG. 6. Both steps 325 and 327 then return to step 315 as the vehicle traverses.

In review, the method detailed in FIG. 3 executes on the hardware platform presented in FIG. 1. This method provides full route guidance instructions to the traveler when the map database associated with the vehicle position has traffic flow restriction information available. Specifically, this means that the selected records retrieved were of the second type. If the map database associated with the vehicle position lacks traffic flow restriction information then the traveler will either be presented with vehicle ground track and approaching intersections. Specifically, this means that the selected records retrieved were of the first type. Guidance cues, including maneuver instructions may be pre-cued by the traveler at the time of route planning, or, alternatively, cued responsive to the present position of the traveler, or vehicle. During transitions of vehicle position between map database types, or map databases encoded with differing information regarding the road segments associated with the present vehicle position, the navigation computer 101 will cause transition screens to be displayed. This system, and method offers a significant advantage over existing navigation systems because it enables a traveler to use either a topology map database or a route guidance database for navigating in a particular area. Also, it warns the traveler when he is about to transit to an unmapped area or a mapped area having only topology type information. This enables a traveler to procure a navigation system today and use whatever maps are available with functionality that matches the media standard available.

Another significant feature of this approach is the route planning and subsequent guidance of the traveler to a position nearest to the specified destination position, if there is a discontinuity in the availability of route guidance map database information between the present position of the traveler and the specified destination position. Note, what is considered the position nearest could take on many forms. It could be the geographical position nearest in distance, the geographical position nearest in transit time, compared to the destination position. Or, if the destination position is an Latvian Restaurant, the intermediate position may be the Latvian Restaurant covered by the map database nearest to the destination position.

The determination of the position nearest to the specified destination position is accomplished by applying the route planning method disclosed next.

FIG. 4 is a software flowchart 400 showing method steps corresponding to a software sub-module callable from the main module shown in the combination of FIG. 3-1 and 3-2. First, in step 401 the routine 400 is entered as mentioned earlier from either step 309, 311, or 313.

In step 403 the navigation computer 101 tests to see if the specified destination position, as determined above, is positioned within boundaries of an area on the map having traffic flow restriction information. If the destination position is positioned within these boundaries then step 405 is executed.

In step 405 an end node for planner is equated, or assigned, to the specified destination position. The end node for planner is necessarily a variable in order to handle the case where the destination position is a variable. This is the case where the specified destination position is not positioned within boundaries of an area on the map having traffic flow restriction information.

Returning to the test in step 403, if the destination position is not positioned within boundaries of an area on the map having traffic flow restriction information, then step 407 is executed.

In step 407 an intermediate destination position is chosen that is nearest to the destination position yet covered by the map database having traffic flow restriction attributes. Inevitably, this position will be on a boundary of the map database. As discussed above the term nearest may have one of many meanings.

Next, in step 409 an end node for planner is equated with the intermediate destination position. Both steps 409 and 405 are followed by step 411.

In step 411 the navigation computer 101 extracts road segments from the map database surrounding the present position of the vehicle by querying the map database provided on CDROM 115 mounted on the CDROM Drive 107. These road segments are entered onto a segment list for further processing.

Next, in step 413 the navigation computer 101 tests to see if the set of records retrieved from the segment list allow for connecting a path between the present position of the vehicle and the end node for planner. If a path can be connected between the present position of the vehicle and the end node for planner, then step 419 is executed. If the set of records retrieved do not allow for connecting a path, then steps 415 and 417 are executed.

In step 415 the segment list is expanded to include road segments connected to the road segments currently on the segment list. This operation includes the navigation computer determining the connected road segments by querying the associated ROAD SEGMENT PREDECESSORS AND SUCCESSORS field 205 from the road segments on the segment list. To ensure that the segment list is limited in size during the iterative operation in the loop 413, 415, and 417, step 417 is executed next.

In step 417 the road segments on the segment list positioned outside of an angular envelope according to the present position and the position referenced by the end node for planner are discarded. Of course, those skilled in the art will recognize other management techniques to bound the segment list. After step 417 the navigation computer returns to step 413. This loop 413, 415, and 417 is iterated until the present position of the vehicle is connected via road segments in the map database to the end node for planner. When a connection is present then step 419 is executed as mentioned earlier.

In step 419 a maneuver instruction list is built from the road segment information located on the segment list. The maneuver instructions are stored in memory indigenous to the navigation computer 101. Then in step 421 the route planner routine 400 is exited returning to step 315 in the flow chart presented in FIG. 3. This completes the discussion of FIGS. 3 and 4.

As an additional feature, the traveler may select between guidance cues including maneuver instructions and guidance cues including traveler ground track and approaching intersections when the present position of the traveler corresponds to an area on the map database that includes topology and connectivity attributes and an additional set of fields describing traffic flow restriction attributes. Some travelers may find it helpful to switch to the aforementioned advisory mode even when full route guidance facilities are available to see the vehicle ground track progress.

Now that the foundation for the system and corresponding method have been described an actual case will be examined.

Figure 9:
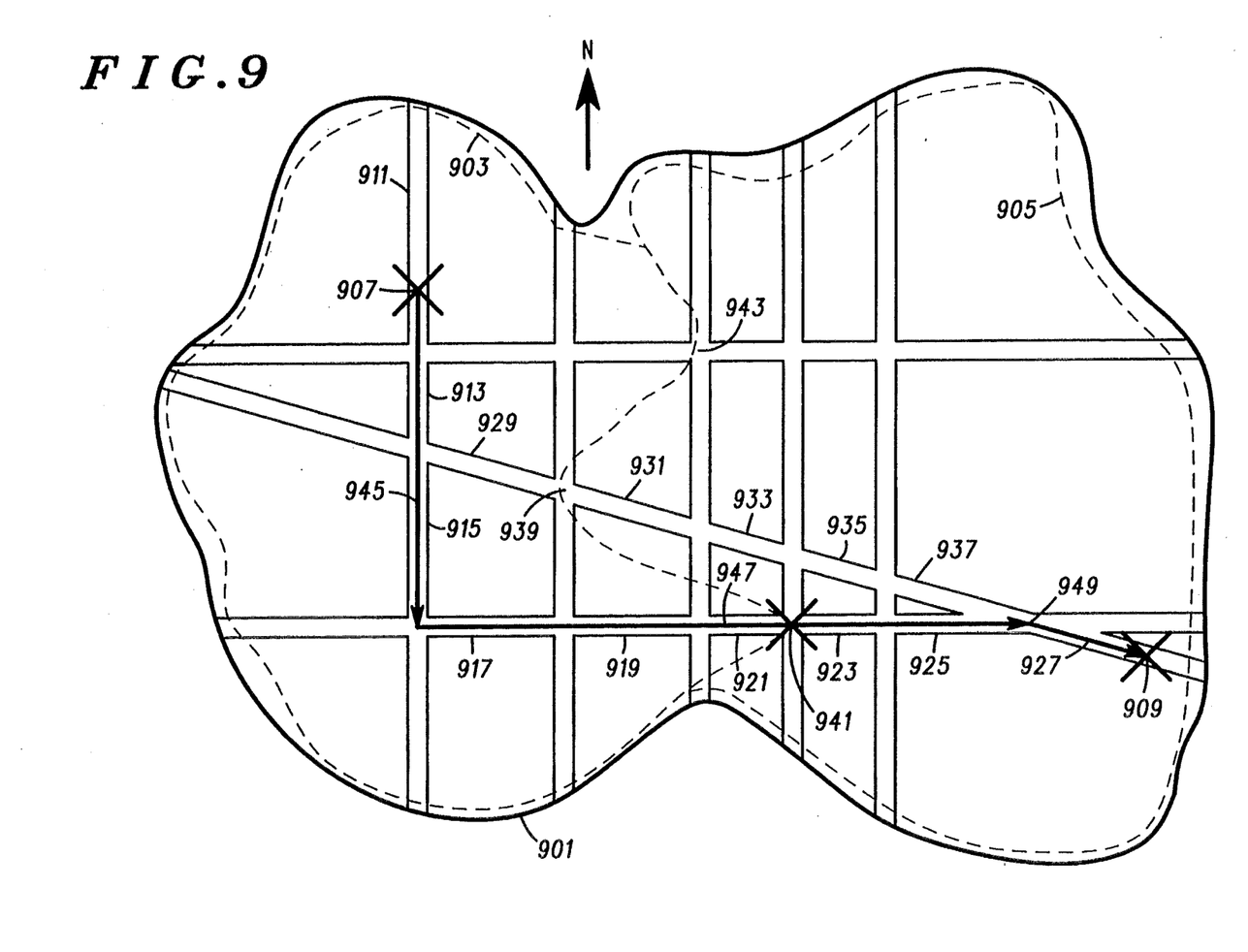
FIG. 9 is a drawing graphically illustrating two different map databases having different types of road segment attributes, and a planned route superimposed onto the graphical database image.

FIG. 9 shows a drawing illustrating two different map databases having different types of road segment attributes, and a planned route superimposed onto a concatenated database image.

The concatenated, or merged, map database image is shown in graphical form with reference number 901. The constituent components include a map database positioned covering an area having traffic flow restriction information 903, and a map database adjacently positioned covering an area having only topology and connectivity information 905.

Note that in the discussion that follows FIGS. 1, 3, 4, and 9 will be referred to. As the system and corresponding method is invoked, a present position of a vehicle is determined by the navigation computer 101 through the use of the vehicle position sensors 103. In this drawing, the present position of the vehicle is denoted by reference number 907. Also, a destination position is selected as described above by the traveler entering his position into the navigation computer 101 via the keypad 111. In FIG. 9 the destination position is denoted using reference number 909.

As the route guidance method steps start executing the destination position is read in step 303, and in step 305 the map database is queried extracting records associated with the present vehicle position and the specified destination position. Since the present position of the vehicle is positioned within a boundary of an area associated with a map database 903 having traffic flow restriction information as determined in step 307, a route will be planned in step 309.

Referring again to FIG. 4, in step 403 the navigation computer 101 finds the destination position 909 to be positioned outside the boundaries of the area 903 on the map having traffic flow restriction information. Specifically, the destination position 909 is positioned within the boundaries of a map database 905 having topology type information. This means that the route guidance system, and associated route planner, is not able to fully guide the traveler from the present position of the vehicle to the selected destination position. Were all road segments on the merged map database encoded with traffic flow restriction information the shortest path would be along the segments denoted by reference numbers 911, 913, 929, 931, 933, 935, 937, and 927. However, when the planner executes step 403 it finds that the destination position 921 is positioned outside the boundaries of an area on the map having traffic flow restriction information.

As a result, step 407 is executed to seek an intermediate destination position nearest to the destination position 921. The choices are 939, 941, and 943. The result is position 941. In this case the criteria for nearest is distance.

Based on equating an end node for planner in step 409, the planner continues by extracting road segments from the map database surrounding the present position of the vehicle. These road segments are entered onto the segment list and are processed as described above. As a result, a route is planned from the present vehicle position 907 to an intermediate position 941.

As the traveler progressively transits from the present position 907, South-wardly along segment 911 to segment 913 and segment 915 the display 113 shows maneuver instructions provided by the planning process 400. For instance, at reference number 945 the display 113 cues a maneuver instruction explaining to the traveler to turn East in 0.5 km. After the designated turn, the vehicle transits along road segments denoted by reference numbers 917, 919, and 921 until it reaches reference number 947. At this position 947 a transition message, such as the one originally introduce in FIG. 7 is shown on the display 113.

Figure 6:
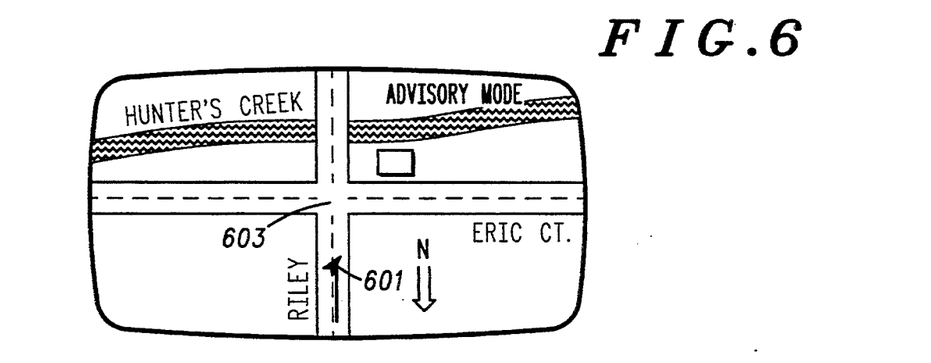
FIG. 6 illustrates additional detail of a visual display shown in FIG. 1.

As the vehicle continues to transit East-wardly, the display 113 shows the vehicle ground track and approaching intersections as originally shown in FIG. 6. Along road segments 923, 925, at intersection 949, and road segment 927, to destination position 909 the traveler must decide how to navigate his vehicle with the provided advisory mode of the dot-on-the-map type display.

In summary, an improved system and method of route guidance has been taught. The features of this system, and corresponding method depart significantly from prior art systems.

This system provides guidance instructions for navigating in a area covered by either a route guidance database or a topology map database. When traversing in a area covered by a topology type database the traveler is provided with historical ground track and approaching intersections. When traversing in an area covered by a map database having traffic flow restriction information, maneuver instructions may be displayed. Also, display screens showing transitions in position between an area covered by one map database type to another are provided. Additionally, a partial route can be planned to an intermediate position nearest to the specified destination position having route guidance type function. This will help the traveler get to a position closest to his destination with the highest quality type of navigation guidance available. In contrast, prior art systems lack all of these features.

Additionally, although only two modes of operation corresponding to two different types of data available are described, additional modes of operation could be presented to the traveler based on additional map database definitions if desired.

The applicants recognize that those skilled in the art of designing route guidance and route planning systems will recognize many useful variants of the above teachings without departing from the essential teaching.

What is claimed is:

1. A system of route guidance comprising:
   input means for receiving information specifying a destination position of a traveler;
   position determining means for providing information indicative of a present position of the traveler;
   map database means for storing a first type of record having topology and connectivity information and for storing a second type of record having topology, connectivity, and traffic flow restriction information; and
   route guidance means, coupled to said input means, said position determining means, and said map database means, wherein said route guidance means retrieves selected records from said map database means, the selected records being determined by the specified destination position and the determined present position of the traveler, and wherein said route guidance means uses a selected record of the first type to provide ground track guidance cues to the traveler, and a selected record of the second type to provide maneuver instruction guidance cues to the traveler.

2. A system in accordance with claim 1 wherein the guidance cues are provided to the traveler responsive to the present position of the traveler.

3. A system in accordance with claim 1 wherein the guidance cues include an indication that maneuver instructions cannot be provided if the present position of the traveler transitions from a position corresponding to a position associated with the map database that includes the second type of record, to a position corresponding to a position associated with the map database that includes the first type of record.

4. A system in accordance with claim 1 wherein the guidance cues include an indication that maneuver instructions can be provided if the present position of the traveler transitions from a position corresponding to a position associated with the map database that includes the first type of record, to a position corresponding to a position associated with the map database that includes the second type of record.

5. A system in accordance with claim 1 further comprising means for selecting between guidance cues including maneuver instructions and guidance cues including traveler ground track and approaching intersections when the present position of the traveler corresponds to a position associated with the map database that includes the second type of record.

6. A route guidance system comprising:
   input means for receiving information specifying a destination position for a traveler;
   position determining means for providing information indicative of a present position of the traveler;
   map database means for storing a first type of record representing road segments having topology and connectivity information and for storing a second type of record representing road segments having topology, connectivity, and traffic flow restriction information; and
   route guidance means coupled to said input means, said position determining means, and said map database means, wherein said route guidance means retrieves selected records from said map database means, the selected records being determined by the specified destination position and the determined present position of the traveler, wherein said route guidance means equates an end node for planner position to the destination position of the traveler if the selected records allow for connecting a path, having traffic flow restriction attributes, between the provided present position and the destination position of the traveler, said route guidance means equates an end node for planner position to an intermediate position nearest to the destination position of the traveler if the set of records retrieved do not allow for connecting a path, having said traffic flow restriction attributes, between the provided present position and the destination position of the traveler and allow for connecting a path, having traffic flow restriction attributes, between the provided present position of the traveler and the intermediate position, wherein said route guidance means connects a planned route between the provided present position of the traveler to the end node for planner position using the road segments extracted from the selected records, and wherein said route guidance means generates a maneuver list including maneuver instructions, the maneuver list determined from the planned route.

7. A system in accordance with claim 6 wherein said route guidance means further provides guidance cues including maneuver instructions extracted from the maneuver list for guiding the traveler from the present position of the traveler to the destination position of the traveler via the planned route if the end node for planner position corresponds to the destination position of the traveler, and for providing guidance cues including maneuver instructions extracted from the maneuver list for guiding the traveler from the present position of the traveler to the intermediate position nearest to the destination position of the traveler via the planned route if the end node for planner position corresponds to the intermediate position.

8. A system in accordance with claim 6 wherein the intermediate position nearest to the destination position comprises the intermediate position nearest in travel time between the present position and the destination position of the traveler.

9. A system in accordance with claim 6 wherein the intermediate position nearest to the destination position comprises the intermediate position nearest in distance between the present position and the destination position of the traveler.

10. A method of route guidance comprising the steps of:
specifying a destination position of a traveler;
determining a present position of the traveler;
providing a map database for storing a first type of record having topology and connectivity information and for storing a second type of record having topology, connectivity, and traffic flow restriction information; and
retrieving selected records from said map database, the selected records being determined by the specified destination position and the determined present position of the traveler, and using a selected record of the first type to provide ground track guidance cues to the traveler, and a selected record of the second type to provide maneuver instruction guidance cues to the traveler.

11. A method in accordance with claim 10 wherein the guidance cues include an indication that maneuver instructions cannot be provided if the present position of the traveler transitions from a position corresponding to a position in the map database that includes topology and connectivity attributes and an additional set of fields describing traffic flow restriction attributes, to a position corresponding to a position in the map database that lacks the additional set of fields describing traffic flow restriction attributes.

12. A method in accordance with claim 10 wherein the guidance cues include an indication that maneuver instructions can be provided if the present position of the traveler transitions from a position corresponding to a position in the map database that lacks an additional set of fields describing traffic flow restriction attributes to a position corresponding to a position in the map database that includes topology and connectivity attributes and the additional set of fields describing traffic flow restriction attributes.

13. A method in accordance with claim 10 further comprising a step of selecting between guidance cues including maneuver instructions and guidance cues including traveler ground track and approaching intersections when the present position of the traveler corresponds to a position on the map database that includes topology and connectivity attributes and an additional set of fields describing traffic flow restriction attributes.

14. A method of route guidance comprising the steps of:
providing a destination position for a vehicle;
providing a present position of the vehicle;
providing a map database having a multitude of records, each record representing a road segment positioned within a geographic area, each of the records having at least a set of fields describing topology and connectivity attributes for the road segment;
retrieving a set of records from said map database, the set of records retrieved determined by the destination position for a vehicle and the present position of the vehicle;
equating an end node for planner position to the destination position for the vehicle if the set of records retrieved allow for connecting a path, having traffic flow restriction attributes, between the provided present position of the vehicle and the destination position for the vehicle, and equating an end node for planner position to an intermediate position nearest to the destination position for the vehicle if the set of records retrieved do not allow for connecting a path, having said traffic flow restriction attributes, between the provided present position of the vehicle and the destination position for the vehicle and allow for connecting a path, having said traffic flow restriction attributes, between the provided present position of the vehicle and the intermediate position;
connecting a path between the provided present position of the vehicle to the end node for planner position using road segments extracted from the set of records retrieved; and
generating a maneuver list including maneuver instructions, the maneuver list determined from the planned route.

15. A method in accordance with claim 14 further comprising the step of providing guidance cues including maneuver instructions extracted from the maneuver list, the guidance cues for guiding the traveler from the present position of the vehicle to the destination position for the vehicle via the road segments, if the end node for planner position corresponds to the destination position for the vehicle, and for providing guidance cues including maneuver instructions extracted from the maneuver list, the guidance cues for guiding the traveler from the present position of the vehicle to the intermediate position nearest to the destination position for the vehicle via the road segments, if the end node for planner position corresponds to the intermediate position.

* * * * *